United States Patent [19]
Sholly, Jr.

[11] Patent Number: 5,575,488
[45] Date of Patent: Nov. 19, 1996

[54] HAND-HELD PART HOLDER AND FIXTURE

[75] Inventor: William C. Sholly, Jr., Souderton, Pa.

[73] Assignee: SRW Associates, Inc., Wilmington, Del.

[21] Appl. No.: 401,799

[22] Filed: Mar. 10, 1995

[51] Int. Cl.⁶ .............................. B23B 31/20; B23B 31/34
[52] U.S. Cl. ........................ 279/4.08; 269/3; 269/309; 269/900; 279/51; 279/5; 409/219
[58] Field of Search ................................ 279/4.07–4.09, 279/51–53, 143, 145, 5; 269/3, 4, 309, 900; 219/98; 409/219, 221, 225, 226

[56] References Cited

U.S. PATENT DOCUMENTS

| | | |
|---|---|---|
| 207,620 | 9/1878 | Parmelee . |
| 2,389,372 | 11/1945 | Lea ............................................. 279/53 |
| 2,620,196 | 12/1952 | Church ...................................... 279/4.08 |
| 3,087,736 | 4/1963 | Lukas ............................................ 279/5 |
| 3,143,356 | 8/1964 | Pray ......................................... 279/4.08 |
| 3,712,386 | 1/1973 | Peters . |
| 4,215,871 | 8/1980 | Hirsch et al. . |
| 4,435,630 | 3/1984 | Jordan ......................................... 219/98 |
| 4,943,071 | 7/1990 | Srebot et al. . |

Primary Examiner—Steven C. Bishop
Attorney, Agent, or Firm—Gregory J. Gore

[57] ABSTRACT

A hand-held, chuck-type part holder provides holding means for a machine part. The hand-held part holder may be secondary holding means for a part which itself is then inserted into a primary machine clamp. The chuck uses standard replaceable collets which may be easily interchanged for different size parts. The collet is actuated by a rod which is moved in turn by an air cylinder which is supported by a handle. The part-gripping collet may be actuated by a tilt switch which provides the automatic clamping action of the collet as the operator turns the holder to the vertical position before inserting or removing a part from the end of the collet. Additionally, a fixture mounted to the bed of the processing machine may be used which guides the part holder into alignment with the primary clamp as it is inserted. The fixture includes pivot and slide means which both support and direct the movement of the part holder.

13 Claims, 4 Drawing Sheets

HAND-HELD PART HOLDER AND FIXTURE

FIELD OF THE INVENTION

This invention relates to machine tools which clamp work parts for machining. More specifically, it relates to manually-controlled workpiece hold-down clamps which cooperate with industrial processing equipment.

BACKGROUND OF THE INVENTION

Many machine parts which require a very short machining time are often manually fed into clamping apparatus to hold the part during the machining process. A parts-processing machine, such as the STUDMASTER® described in U.S. Pat. Nos. 5,209,094 and 5,329,796, is representative of a machine which fits this category. In this case, the machining operations are threading, chamfering and stamping of metal rods. Parts are manually inserted into a power-operated clamp on the bed of the machine which holds the rods while they are processed.

This act of hand-inserting parts into the machine part clamp is extremely effective, except in the case of very small parts, such as threaded nuts or short, small-diameter studs. Smaller parts may not be sufficiently clamped and because they may be difficult for the operator to handle, insertion and removal to and from the clamp is slow. Furthermore, placing the operator's fingers close to the clamp could also be dangerous. There is, therefore, a need for a clamping system for small machine parts which is fast, accurate and safe.

The most pertinent patent prior art of which the applicant is aware includes U.S. Pat. No. 207,620 issued to J. Parmelee on Sep. 3, 1878; U.S. Pat. No. 3,712,386 issued to R. Peters on Jan. 23, 1993; U.S. Pat. No. 4,215,871 issued to Hirsch et al on Aug. 5, 1980; and U.S. Pat. No. 4,943,071 issued to Srebot et al on Jul. 24, 1990. While all of these patents are pertinent in that they show article-grasping collets, none singularly or in combination with others teaches or suggests the novel and unobvious features of the claimed invention.

SUMMARY OF THE INVENTION

In order to produce a safe and efficient machining system for small parts, the present hand-operated, chuck-type part holder has been devised. The present chuck-type holder provides secondary holding means for the part which is then inserted into the primary machine clamp that in turn secures the part-holding chuck. This double-clamping system provides many advantages which will now be described in conjunction with further details of the present invention.

The part holder of the present invention utilizes a chuck-type clamp that includes a central collet which is positioned within an elongate cylindrical body, hereinafter referred to as the "nosepiece". The outside diameter of the nosepiece is equal to the inside diameter of the primary clamp. The chuck uses standard type, replaceable collets which may be easily interchanged for different size parts, thus eliminating the need for adjusting the primary clamp. The part-holding chuck is hand-held and has a handle for manually gripping at one end and the above-described elongate cylindrical nosepiece at the opposite end which surrounds the part-gripping collet. The collet is actuated by a rod which is moved by an air cylinder located in the main body of the holder assembly between the handle and the nosepiece. The air lines to and front the air cylinder are directed to pass within the handle and out of the end so as not to obstruct the operator.

In one embodiment of the present invention, the part-gripping collet is actuated by a tilt switch located on the holder. In use, the device is normally tilted upward so that the operator may change parts in the raised, open nosepiece end of the clamp, the parts being held within the collet by gravity when the collet is open. The part holder is then tilted to a horizontal position as it is inserted into the primary clamp, which has jaws that normally hold the part horizontally. In order to make the holder more efficient, as the angle of the holder is moved from vertical to horizontal, the tilt switch automatically energizes the air cylinder that moves the collet into clamping position around the part. Conversely, the clamping action of the collet is released when the holder is moved from the horizontal position back to vertical, thus completing the clamping cycle. The holder is compact and lightweight, and can be held free from the machine and held close to the operator. Therefore, it is extremely easy to see the parts and easy to insert and remove small parts from the upward facing mouth of the collet. Since the parts are held in place by gravity when the holder is vertical and clamping occurs automatically when the collet is moved from vertical, parts cannot be dropped.

In yet another embodiment, a fixture is mounted to the bed of the processing machine which guides the part holder into alignment with the primary clamp as it is inserted. The fixture includes pivot means which permits the holder to be tilted between vertical and horizontal positions as described above. As awl alternate means for actuating the collet, another more commonly used control, such as an operator foot pedal, may be employed in place of the tilt switch. The fixture further includes a pair of parallel guide rails with slides, each of which has an inward facing arm that forms a yoke about either side of the body of the part holder. The part holder is pivotal about pins inserted through the arms of each slide. Further control of the movement of the holder is provided by stops on the guide rails which accurately limit the horizontal movement of the holder. The stops provide an accurate and repeatable insertion depth of the holder into the primary clamp. This ensures the uniform and accurate machining of the parts.

More specifically, the applicant has devised a workpiece part-clamping system for a metalworking machine, comprising a primary clamp affixed to the machine and a hand-held workpiece holder having a main body supporting a nosepiece at one end with a handle at the other end. A secondary clamp having resilient jaws with tapered outer starfaces is located within the nosepiece and is linearly movable relative to the nosepiece. A tapered inner surface of the nosepiece bears against the outer surface of the clamp jaws, such that the jaws of the clamp are moved to a gripping position about a part when the clamp is retracted within the nosepiece. The insertion depth of the part into the clamp is determined by an axially-positioned rod stop which abuts the part when it is fully inserted. The gripped part is then released as the clamp is advanced out of the nosepiece where the jaws, being resiliently biased in the open position, move away from the part. Means, such as an air cylinder, is provided for moving the clamp between retracted and advanced positions. A tilt switch may be included which is electrically connected to the air cylinder actuator. The tilt switch is responsive to the angular position of the holder in the vertical plane such that the clamp is actuated by tilting the holder.

The invention may further include a fixture attached to the metalworking machine, comprising a pair of horizontal, lateral guide rails which slidably support the workpiece holder between withdrawal and insertion positions, the insertion position placing the outer diameter of the nosepiece within the jaws of the primary clamp of the metalworking machine. Slides located about the lateral guide rails support the holder main body pivotally. The part holder is rotatable so that it faces the end of the nosepiece and mouth of the collet upward with respect to the lateral guide rails when the part holder is withdrawn. Linear travel stops affixed to the guide rails are selectively movable to different positions providing adjustment means for determining the length of travel of the holder. Tilt stops are provided to limit the angular rotation of the part holder with respect to the guide rails. The clamp is preferably a type well-known as a collet.

It is therefore the primary object of the present invention to provide a secondary clamping system for small, manually-fed machine parts which is efficient and safe to use. It is another object of the present invention to provide such a holder which can be easily hand-operated and which results in the accurate machining of parts. It is yet another object of the present invention to provide such a hand-operated holder with automatic clamping capability. It is yet another object of the present invention to provide a holder with means to accurately align and insert it into the primary clamp of a processing machine.

Other objects, advantages and novel features of the invention will become apparent from the following detailed description of the invention when considered in conjunction with the accompanying drawings.

DESCRIPTION OF THE PREFERRED EMBODIMENT

Figure 1:
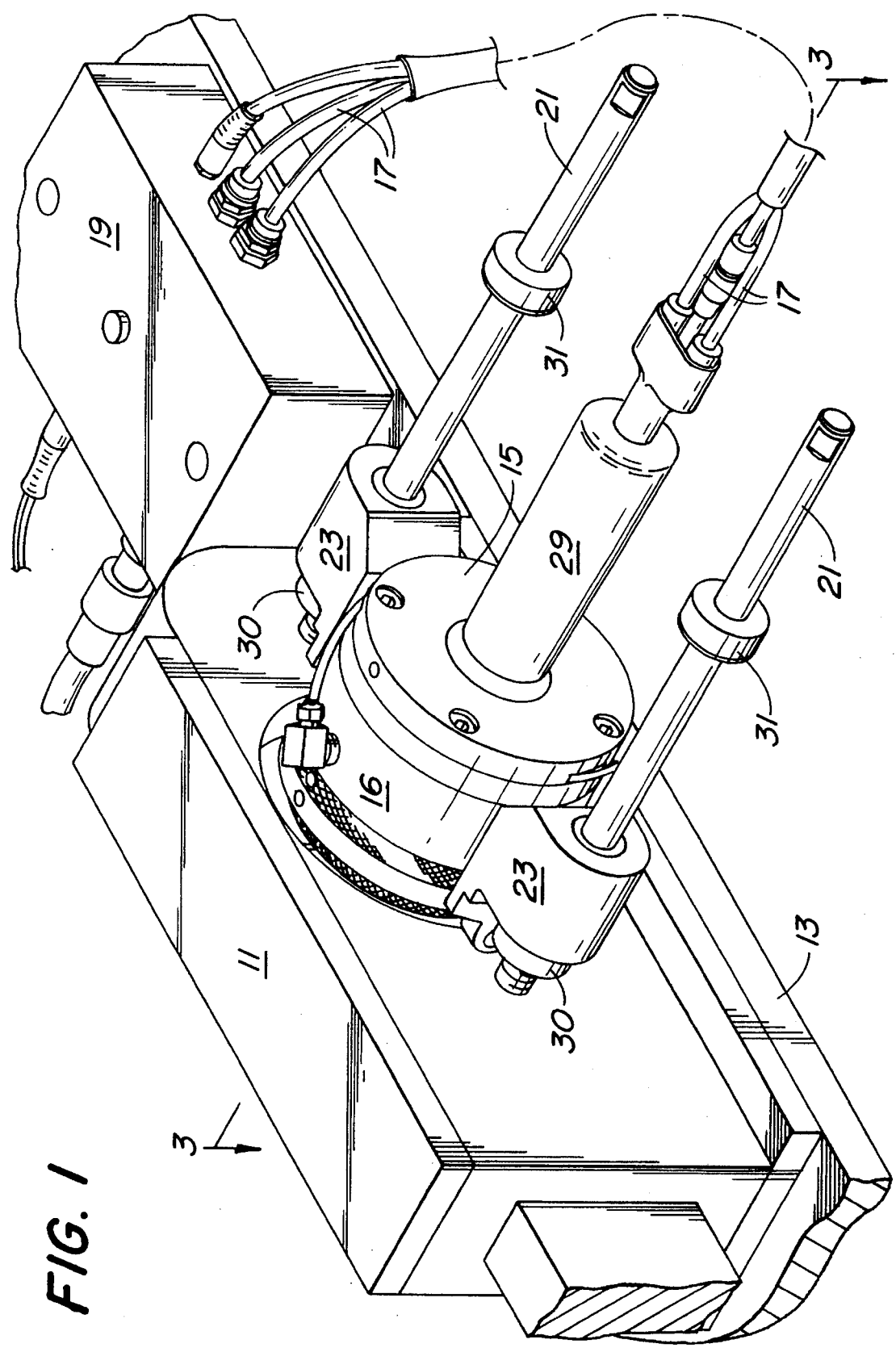
FIG. 1 is a top left front isometric view showing the holder fully inserted into the processing machine primary clamp.

Referring now to FIG. 1, the workpiece holder of the present invention is shown fully inserted into the primary clamp 11 of a metalworking machine (not shown), which is secured to a common base shown as structure 13. The part or workpiece is held within the holder 15 that is removable from the primary clamp 11. Actuation of the part holder is by an air cylinder that receives air through lines 17 that are connected to a power distributor block 19. The distributor block includes necessary valving to control the flow of air and thus the operation of an air cylinder within the main body 16 of the part holder 15. While the part holder may be removed and held completely free of any connection with the other machine elements, in this embodiment it is shown slidably and pivotally secured to the machine by horizontal, lateral guide rails 21 and opposing slides 23. In use, the part holder is withdrawn from the clamp and turned manually by way of handle 29. Stops 30 and 31, which are affixed to the guide rails, limit the horizontal range of movement of the part holder. Insertion stops 30 are threadably secured to the guide rails to provide fine adjustment of the insertion depth of the part into the primary clamp.

Figure 2:
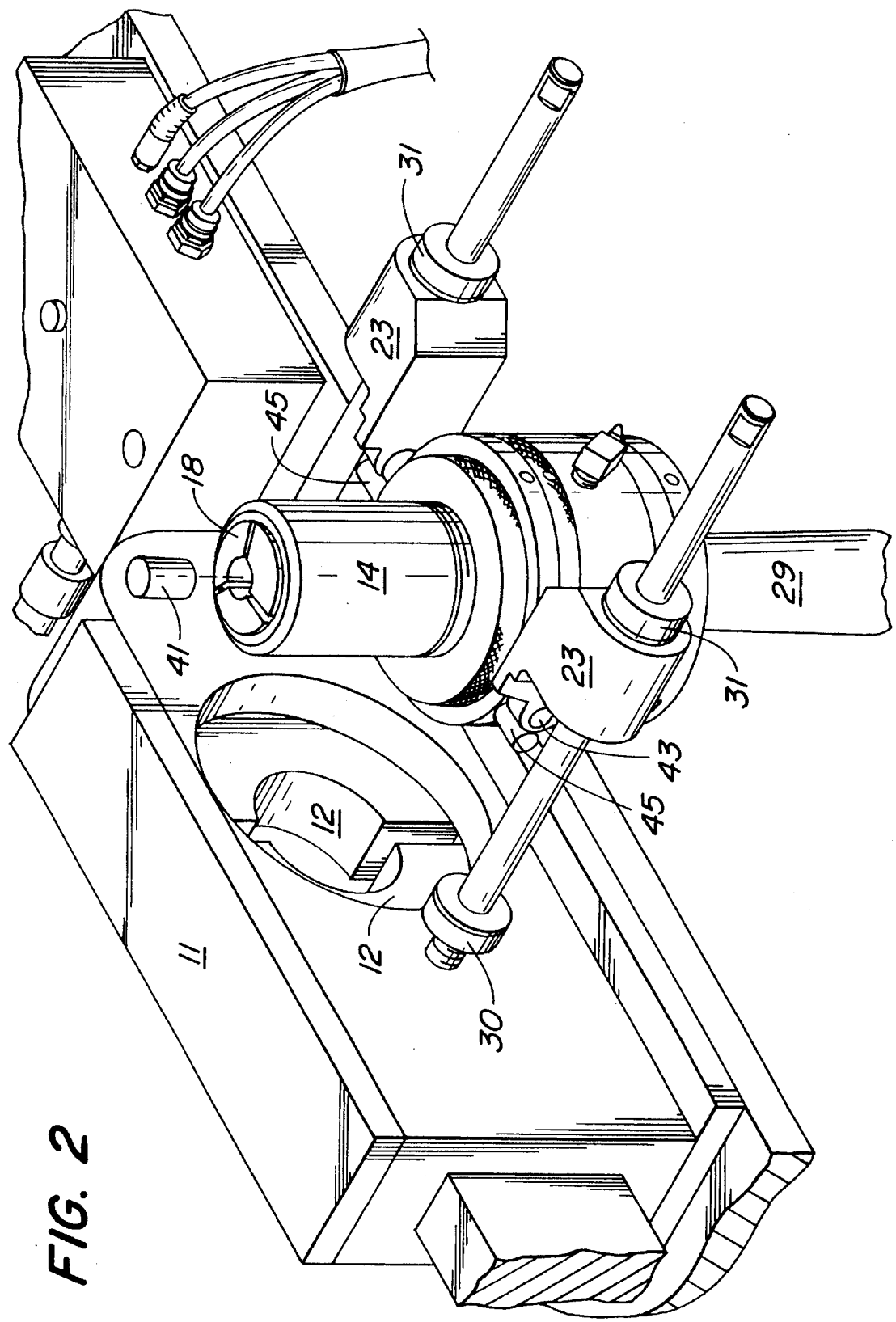
FIG. 2 is a top left front isometric view of the same structure shown in FIG. 1, but with the holder moved into the retracted position.

Referring now to FIG. 2, the part holder is shown in its withdrawn position and tilted to a vertical orientation so that the part to be machined 41 can be interchanged. This figure also shows greater detail of the primary clamp 11 which has clamping jaws 12. These jaws have an internal clamping diameter which is equal to the outside diameter of the nosepiece portion 14 of the part holder unit. A standard type collet 18, well-known as a "5C collet", is carried within the nosepiece. Each of the slides 23 include inward-facing, horizontally-extending arms which are apertured to receive a pivot pin 43 that is secured to the main body of the part holder. The part holder is free to pivot between horizontal and vertical positions about the pivot pins and to move horizontally between stops 31. The part holder also includes tilt-stop pins 45 which contact abutments on the rear side of the slides when the part holder is moved into its full desired horizontal position. It will be readily understood by those of skill in the mechanical arts that by these mechanical relations, the part holder may be properly aligned with the primary clamping jaws and easily moved into and out of a repeatable clamping position using the handle, simply by manually rotating and sliding the part holder between the angular and linear stops described above. This permits the operator to move the part holder very quickly into and back out of the primary clamp. It can also be seen from this figure that with the nosepiece retracted from the primary clamp and facing upward, the mouth of the collet is presented close to and facing the operator so that parts may be easily interchanged.

Figure 3:
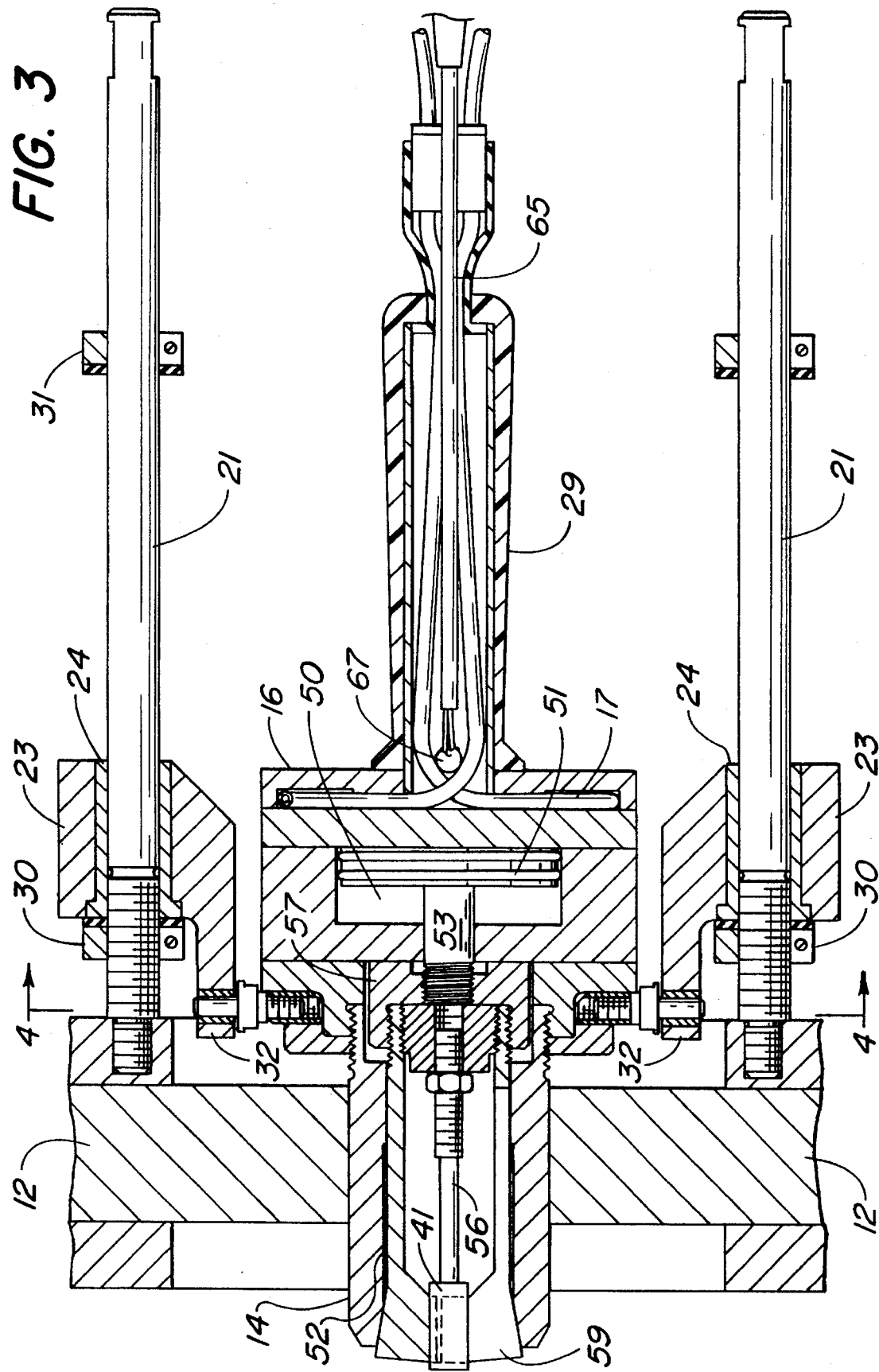
FIG. 3 is a top sectional view taken from FIG. 1 as shown in that figure.

Referring now to FIG. 3, greater detail of the operational structures of the part holder is shown. In this Figure, the part holder is shown fully inserted between the primary clamping jaws 12 that have an internal clamping diameter equal to the outside diameter of the nosepiece 14. The part holder includes a main body 16 that houses an air cylinder 50 with piston 51 and connecting rod 53. The air cylinder moves the collet collar 57 and, hence, the collet 59 reciprocally between retracted and advance positions, to either grip or release the part 41. The depth within the collet that the part is held is determined by rod stop 56. The rod stop abuts the end of the part 41 when it is fully inserted and may be adjusted by thread means on the collet collar 57. Different size collets may also be easily interchanged by unscrewing and re-inserting them into threaded collet collar 57. The nosepiece 14 includes a 10-degree tapered internal bore 52 that wedges the resilient collet jaws to the closed position as it is retracted by the air cylinder piston 51. Air delivered to and from opposite sides of the piston are provided by supply lines 17. The air supply lines pass into the part holder through the handle 29, together with electrical line 65, which connects a tilt switch 67 to electromechanical air valuing located in the power distributor block diagrammatically depicted in FIG. 5.

Referring again to FIG. 3, opposing slides 23 include sleeves 24 which ride along guide rails 21 between the linear travel stops 30 and 31. the slides include inward-facing arms 32 that are substantially parallel to each other, and include bearings that receive horizontal pins extending from the main body 16 of the pan holler so that it is pivotal about the pins between horizontal and vertical positions.

Figure 4:
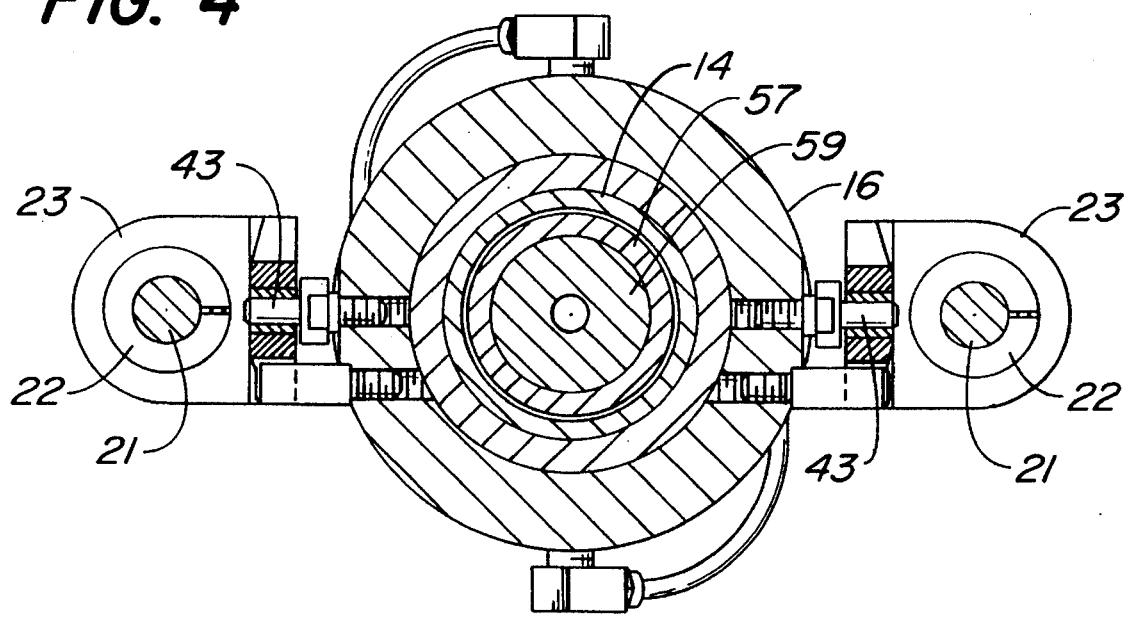
FIG. 4 is a rear sectional view taken from FIG. 3 as shown in that figure.

Referring now to FIG. 4, a sectional view taken from FIG. 3 shows greater detail of the part holder internal structures which are concentrically arranged and may be described from the inside out as: rod stop 56, collet 59, collet collar 57, nosepiece 14, and the main body 16. In this figure, the pivot pins 43 are more clearly shown, and are depicted in abutting relationship with surfaces on both of the slides. the pivot pins 43 are diametrically opposed and are affixed to the main body of the part holder by thread means. Pivot pins are located within apertures in the slides 23 with a loose-fit that permits the free rotation of the part holder. Each of the lateral slides rides on the guide rails 21 and includes linear bearing sleeve 22.

Figure 5:
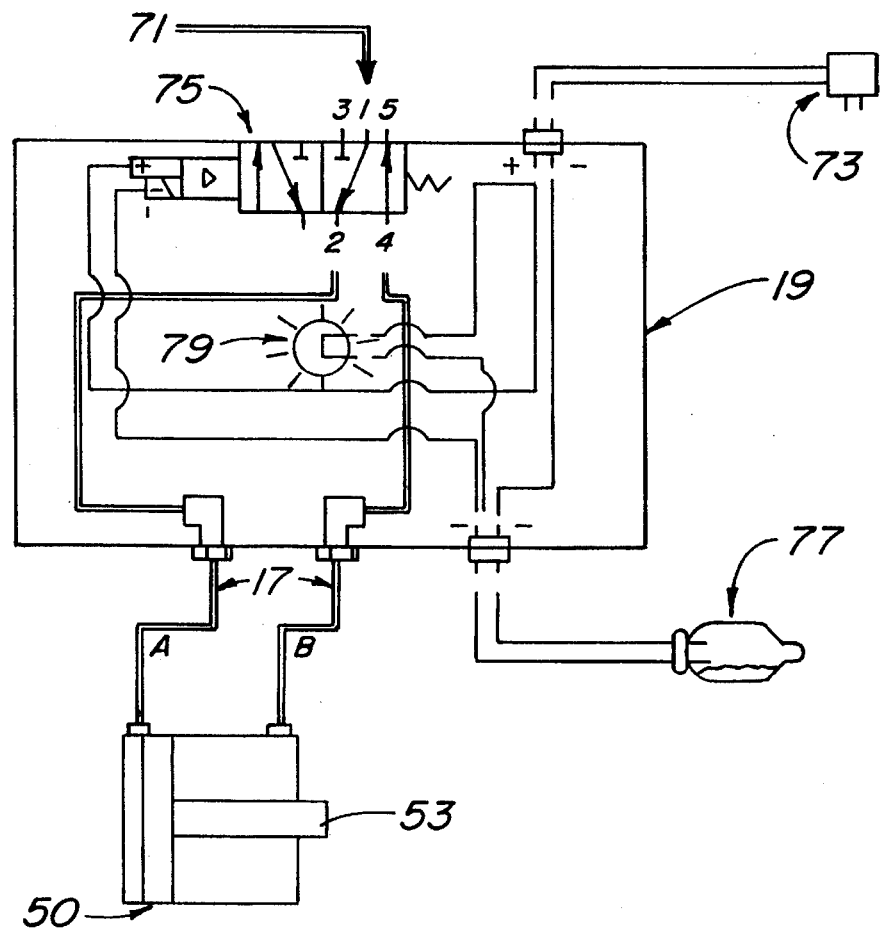
FIG. 5 is a diagram showing the electrical and air circuitry of the present invention.

Referring now to FIG. 5, a simple diagram of the air and electrical circuits is shown. Air cylinder 50 which moves the clamp of the present invention between advanced and retracted positions is controlled by the air lines 17. Air provided to lines 17 is controlled through distributor block 19 which receives the main air supply through line 71. As shown in this diagram, the main air supply line is fed into port 1 of a solenoid air control valve 75 which distributes the air between ports 2 and 4 in order to direct air to either side of the piston within air cylinder 50 to either advance or retract the piston rod 53.

The distributor block also includes an electrical circuit that actuates the solenoid control valve 75. In one embodiment, a tilt switch such as mercury bulb switch 77 located on the part holder determines the position of the solenoid control valve between one of two positions. Electrical power is supplied through converter 73 which converts 110-volt AC to 12-volt DC. Indicator lamp 79 shows when the electrical supply to the unit is "on". In operation, the mercury in the bulb switch makes contact with wires in the bulb when the part holder is moved from vertical orientation. This closes the electrical circuit, which energizes the solenoid valve. The air control valve then directs air from the main air supply through port 4, providing air through lines 17 to force the piston 50 within the air cylinder backward (to the left in this diagram). This retracts the piston rod connected to the collet, thus constricting the collet about the part to be clamped. In an alternate embodiment, the tilt switch is replaced by a simple operator-controlled contact switch that may be operated by a foot pedal (not shown in this diagram).

It should be understood that the above description discloses specific embodiments of the present invention and are for purposes of illustration only. There may be other modifications and changes obvious to those of ordinary skill in the art that fall within the scope of the present invention which should be limited only by the following claims and their legal equivalents.

What is claimed is:

1. A workpiece holder, comprising:

a main body of the holder supporting nosepiece at one end and a handle at the other end;

a clamp having resilient jaws with outer surfaces located within said nosepiece, said nosepiece including a tapered, inner surface bearing against said outer surface of said clamp jaws, said clamp being linearly movable relative to said nosepiece between at least two positions;

a retracted position of said clamp where said inner surface of said nosepiece bears against said jaws moving them to a gripping position;

an advanced position of said clamp where said jaws, being resiliently biased in the open. position, move to a release position;

powered means for moving said clamp between said retracted and said advanced positions, wherein said powered means for moving said clamp comprises an air cylinder located within said holder main body, said cylinder including a piston connected to said clamp; and a power distribution block which regulates air flow from a main supply to and from said air cylinder, wherein the regulation of said air flow is provided by an electrically activated valve, said valve being controlled by changing its electrical supply between "on" and "off" states, the electrical supply to said valve being actuated by an operator-controlled switch, wherein said switch is a tilt switch on said holder responsive to the angular position of the holder in the vertical plane such that the electrical supply to said valve is changed when said holder is tilted between horizontal and vertical positions.

2. The workpiece holder of claim 1, wherein said clamp is a collet.

3. A workpiece clamping system for a metalworking machine, comprising:

a primary clamp affixed to said machine;

a hand-held workpiece holder having a main body supporting a nosepiece at one end and a handle at the other end;

a second clamp having resilient jaws with outer surfaces located within said nosepiece, said nosepiece including a tapered, inner surface bearing against said outer surface of said second clamp jaws, said second clamp being linearly movable relative to said nosepiece;

a retracted position of said second clamp where said inner surface of said nosepiece bears against said jaws moving them to a gripping position;

an advanced position of said second clamp where said jaws, being resiliently biased in the open position, move to a release position;

means for moving said second clamp between said retracted and said advanced positions; and means for inserting said nosepiece of said workpiece holder into said primary clamp.

4. the workpiece clamping system of claim 3, wherein said means for inserting said nosepiece into said primary clamp comprises a fixture attached to said metalworking machine, said fixture including a pail-of horizontal lateral guide rails which slidably support said workpiece holder between withdrawal and insertion positions, said insertion position placing the outer diameter of said nosepiece within jaws of the primary clamp of said metalworking machine.

5. The workpiece clamping system of claim 4, further including slides located about said lateral guide rails, said slides supporting said holder main body pivotally such that said part holder is rotatable to face the end of said nosepiece upward with respect to said lateral guide rails when said part holder is in said position of withdrawal.

6. The workpiece clamping system of claim 5, further including a tilt switch on said holder responsive to the angular position of said holder in the vertical plane, said switch being electrically connected to said means for moving said second clamp whereby said second clamp is actuated by tilting said holder.

7. the workpiece clamping system of claim 6, including linear travel stops affixed to said lateral guide rails for limiting the travel of said slides along said guide rails.

8. The workpiece clamping system of claim 5, wherein said stops are selectively movable to different positions along said guide rails providing adjustment means for determining the length of travel of said holder.

9. The workpiece clamping system of claim 8, wherein said clamp is a collet.

10. The workpiece clamping system of claim 9, further including at least one tilt stop which limits the angular rotation of said part holder with respect to said guide rails.

11. The workpiece clamping system of claim 10, wherein said second clamp further includes a rod stop axially located within said resilient jaws for limiting the insertion depth of said workpiece into said second clamp.

12. A workpiece holder, comprising:

a main body of the holder supporting a nosepiece at one end and a handle at the other end;

a clamp having resilient jaws with outer surfaces located within said nosepiece, said nosepiece including a tapered, inner surface bearing against said outer surface of said clamp jaws, said clamp being linearly movable relative to said nosepiece between at least two positions;

a retracted position of said clamp where said inner surface of said nosepiece bears against said jaws moving them to a gripping position;

an advanced position of said clamp where said jaws, being resiliently biased in the open position, move to a release position;

powered means for moving said clamp between said retracted and said advanced positions; and an electric switch for controlling electric power to said powered means being a tilt switch on said holder responsive to the angular position of the holder in the vertical plane such that the electric power is changed when said holder is tilted between horizontal and vertical positions.

13. A workpiece clamping system for a metalworking machine, comprising:

a primary clamp affixed to said machine;

a hand-held workpiece holder having a main body supporting a nosepiece at one end and a handle at the other end;

a second clamp having resilient jaws with outer surfaces located within said nosepiece, said nosepiece including a tapered, inner surface bearing against said outer surface of said second clamp jaws, said second clamp being linearly movable relative to said nosepiece;

a retracted position of said second clamp where said inner surface of said nosepiece bears against said jaws moving them to a gripping position;

an advanced position of said second clamp where said jaws, being resiliently biased in the open position, move to a release position; and means for moving said second clamp between said retracted and said advanced positions.

\* \* \* \* \*